United States Patent
Bernett et al.

(10) Patent No.: US 9,458,936 B2
(45) Date of Patent: Oct. 4, 2016

(54) APPARATUS WITH POLYMER PERMEABILITY PATH

(71) Applicant: Seagate Technology LLC, Cupertino, CA (US)

(72) Inventors: Frank William Bernett, Niwot, CO (US); Neal Gunderson, Lake Elmo, MN (US); Steven Lee Weber, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 85 days.

(21) Appl. No.: 14/085,265

(22) Filed: Nov. 20, 2013

(65) Prior Publication Data

US 2015/0137644 A1    May 21, 2015

(51) Int. Cl.
  *G11B 33/14*    (2006.01)
  *F16J 15/02*    (2006.01)
  *G11B 25/04*    (2006.01)

(52) U.S. Cl.
  CPC ............ *F16J 15/022* (2013.01); *G11B 25/043* (2013.01); *G11B 33/1466* (2013.01)

(58) Field of Classification Search
  CPC .............. G11B 33/148; G11B 33/022; G11B 33/1446; G11B 33/1466; G11B 33/1486; G11B 17/038; G11B 33/146
  USPC ......... 360/97.12, 99.15, 99.16, 99.18, 99.19, 360/99.21, 99.22
  See application file for complete search history.

(56) References Cited

U.S. PATENT DOCUMENTS

| | | | |
|---|---|---|---|
| 4,367,503 A * | 1/1983 | Treseder ................... 360/99.18 |
| 5,434,748 A * | 7/1995 | Fukui .................... H05K 5/068 |
| | | | 174/559 |
| 6,556,372 B2 * | 4/2003 | Hearn et al. ............... 360/99.21 |
| 6,970,322 B2 | 11/2005 | Bernett |
| 7,016,145 B2 | 3/2006 | Gunderson et al. |
| 7,123,440 B2 | 10/2006 | Albrecht et al. |
| 7,218,473 B2 | 5/2007 | Bernett et al. |
| 7,428,122 B2 | 9/2008 | Kimura et al. |
| 7,684,146 B1 * | 3/2010 | Andrikowich et al. ... 360/99.21 |
| 7,729,083 B2 | 6/2010 | Hatchett et al. |
| 8,199,425 B1 * | 6/2012 | Gustafson et al. ........ 360/97.12 |
| 8,248,724 B2 * | 8/2012 | Hayakawa et al. ........ 360/97.22 |
| 8,279,552 B2 | 10/2012 | Stipe |
| 8,335,050 B2 | 12/2012 | Kavosh et al. |
| 8,533,934 B2 | 9/2013 | McGuire, Jr. et al. |
| 8,659,849 B2 * | 2/2014 | Hayakawa et al. ........ 360/97.22 |
| 2003/0179489 A1 * | 9/2003 | Bernett et al. ............ 360/97.01 |
| 2005/0184463 A1 | 8/2005 | Boutaghou et al. |
| 2007/0291407 A1 * | 12/2007 | Stasiewicz et al. ....... 360/99.12 |
| 2013/0074323 A1 | 3/2013 | Kavosh et al. |

* cited by examiner

*Primary Examiner* — Will J Klimowicz
(74) *Attorney, Agent, or Firm* — Crawford Maunu PLLC

(57) ABSTRACT

Certain exemplary aspects of the present disclosure are directed towards an apparatus in which a base deck and a base deck cover interface with one another to provide a permeability path. The base deck includes an outer region, and the base deck cover includes a lip that interfaces with the outer region of the base deck to provide the permeability path. The permeability is further defined by at least three interleaved sidewalls of the base deck and base deck cover that define two segments of the permeability path. The permeability path is filled with a polymer material that creates a seal between the base deck and base deck cover.

17 Claims, 4 Drawing Sheets

APPARATUS WITH POLYMER PERMEABILITY PATH

SUMMARY

Various example embodiments are directed to apparatuses and/or methods that facilitate the coupling of components with relatively low permeability, under conditions in which constraints limit the size/spacing for the coupling. Certain embodiments achieve such low permeability by enhancing or extending the length of a path via which atmospheric components must travel to escape an enclosure having respective components bonded to one another. In some implementations, such approaches are achieved while also limiting or reducing overall width of the bond. One or more of these embodiments may be particularly applicable, for example, to disc drives (sometimes referred to as disk drives) in which the bond between components operates to mitigate or prevent the escape of low density atmosphere from within the disc drive, while also achieving compact construction.

In a particular embodiment, interleaved sidewalls define parallel segments of a permeability path along which a base deck and base deck cover of a disc drive are adhered to one another. These interleaved sidewalls, coupled with the use of an adhesive, operate to seal a low density material (e.g., gas) within the disc drive. Specifically, the permeability path facilitates the use of an adhesive-type substance between the interleaved sidewalls, which operate together to adhere the sidewalls to one another and also mitigate the escape of low density atmosphere from within the disc drive. The parallel segments significantly increase (e.g., double) the length of the permeability path for a given height, while achieving a compact coupling area. In many embodiments, the resulting permeability path provides a bond length that is longer than an overall height of the disc drive. Using approaches as described herein, the effective length of the permeability path is relatively enhanced, addressing various problems including the problems discussed herein.

Various example embodiments are directed to methods and/or apparatuses that involve providing an elongated permeability path at an interface between a base deck and a base deck cover. In some embodiments, the base deck cover is a combination of an electrical interconnect and a seal plate. The base deck has an outer region that interfaces with a lip of the base deck cover, in which the outer region (e.g., a trench-like region) and the lip provide interleaved/interfacing sidewalls that define the permeability path (e.g., with three or more interleaved sidewalls or sidewall surfaces). The permeability path is filled with a polymer material that forms a hermetic seal between the base deck and base deck cover.

Consistent with further embodiments, other aspects are directed toward an apparatus that includes a base deck and a base deck cover, in which the base deck has a cavity defined by two or more opposing sidewalls that interface with a lip-type structure of the base deck cover. The cavity extends around at least a portion of the base deck, and in some implementations, extends as a trench along a perimeter of the base deck. The lip-type structure is sized and otherwise arranged to extend into the cavity upon placement of the cover in an engaged condition with the base deck. The interfaced lip-type structure and cavity provide a permeability path along interfacing surfaces of the sidewalls and lip. The permeability path is filled with a polymer material, which operates to seal atmospheric components within the base deck and cover.

In some embodiments, the above approach involves forming a hermetically sealed housing that contains low density atmosphere. The housing also supports a spindle motor that rotates a data storage medium, and an actuator assembly that supports at least one data transducer adjacent the at least one data storage medium.

Consistent with various other embodiments and aspects of the present disclosure, a method is disclosed in which a hermetic seal is applied to a housing of a data storage assembly. To apply the hermetic seal, a polymer material is inserted into a cavity defined by two or more opposing sidewalls of a base deck. The cavity extends around at least a portion of the base deck, such as discussed above. A base deck cover having a lip is coupled with the base deck, by interfacing the lip within the cavity containing the polymer material. The lip and sidewalls form a permeability path that extends along respective segments defined by the lip and sidewalls, which hermetically seals the housing.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
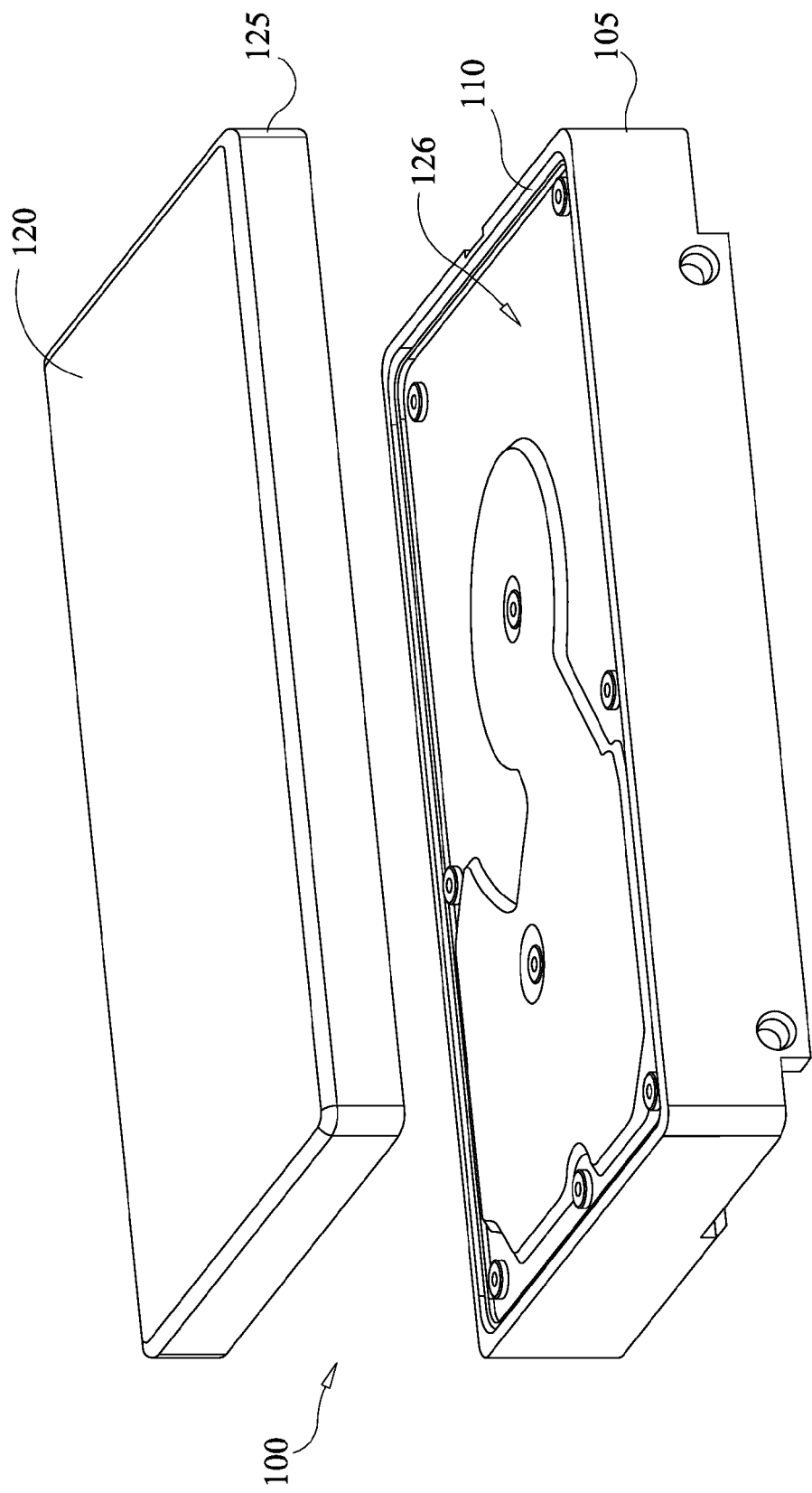
FIG. 1 is a perspective view of a disc drive, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements involving an elongated permeability path that hermetically seals a base deck to a base deck cover. Specific embodiments are believed to be particularly beneficial to sealed disc drive apparatuses, such as disc drives containing low density atmosphere (e.g., helium atmosphere). While the present invention is not necessarily so limited, various aspects of the invention may be appreciated through a discussion of examples using this context.

In some embodiments, interleaved sidewalls define two or more parallel segments of a permeability path via which a disc drive base deck and base deck cover are coupled. The interleaved sidewalls are filled with a material that mitigates the escape of low density atmosphere from within the disc drive. The effect of the parallel segments of the permeability path is to increase the length of the permeability path for a given height (e.g., by doubling), while also facilitating compact design (e.g., minimizing one or more dimensions of the coupling area). In many embodiments, the resulting permeability path provides a bond length (bonding of the base deck and cover along the permeability path) that is longer than an overall height of the disc drive.

The doubling of the permeability path can be particularly useful for smaller 2.5" form factor disc drives. The permeability path, as discussed herein, is implemented for this smaller form factor disc drive to maintain a rate of low density atmosphere leakage via the interface between a base deck and a base deck cover that is not greater than 0.25 cm$^3$/year ($1\times10^{-8}$ cm$^3$/sec). In an exemplary 2.5" form factor disc drive, the low maintained leakage rate of less than 5% leakage (1.25 cm$^3$), of an initial low density atmosphere of about 25 cm$^3$, maintains proper functionality of the disc drive over a usable life of up to five years.

Various example embodiments are directed to an apparatus and/or method involving an enhanced permeability path, which provides an extended length for given constraints (e.g., path size). The enhanced permeability path can be used to greatly reduce the escape of low density atmosphere from within a disc drive, and accordingly extend the useful life of the disc drive.

In certain embodiments of the present disclosure, a disc drive base deck includes an outer region that interfaces with a lip of a base deck cover. The interface between the base deck and the base deck cover provides a permeability path that extends along three or more interleaved sidewalls, which define segments of the permeability path. In some embodiments, the base deck cover is a combination of an electrical interconnect and a seal plate. The permeability path is filled with a polymer material that forms a hermetic seal between the base deck and base deck cover. This hermetic seal may greatly reduce the escape of low density atmosphere from within the disc drive.

According to one such embodiment, the polymer material that occupies the permeability path is free of voids, or substantially free of voids, that would otherwise allow for increased permeability of the low density atmosphere within the disc drive. Such a void-free permeability path is facilitated by interfacing features of the base deck and base deck cover, which form the permeability path. A material such as a polymer can be pre-filled within a region of the base deck, prior to coupling the base deck and cover, in which the base deck cover lip is inserted into the pre-filled region of the base deck. In other embodiments, the polymer material can be injected into the permeability path, pre-coated on the base deck or base deck cover, and/or applied as a solid (e.g., film).

In conjunction with one or more such embodiments, it has been discovered that such an approach involving the interfacing components along the permeability path can achieve a bond that is substantially free of voids. Such an approach can mitigate the introduction of voids that may increase a leakage rate of material from within the disc drive (or the passage of material into the disc drive).

In many applications, a permeability path as discussed herein is implemented to maintain a rate of low density atmosphere leakage via the interface between the base deck and the base deck cover that is not greater than 1 cm$^3$/year ($4\times10^{-8}$ cm$^3$/sec). Such a low maintained leakage rate can achieve less than 5% leakage (5 cm$^3$) of an initial low density atmosphere of about 100 cm$^3$ in the disc drive.

Consistent with further embodiments, other aspects are directed toward an apparatus that includes a base deck with a cavity defined by at least two opposing sidewalls. The cavity extends around at least a portion of the base deck and interfaces with a lip of a base deck cover to facilitate the sealing of components within the base deck. The interfaced lip and cavity provide a permeability path, including two segments defined by the lip and cavity (e.g., between surfaces of the lip and sidewalls), and the permeability path is filled with polymer material. The base deck and the base deck cover form, with the polymer material (e.g., cured), a hermetically sealed housing that contains low density atmosphere.

In certain embodiments, the housing is used as a disc drive housing that supports a spindle motor and an actuator assembly. The spindle motor rotates one or more data storage components and the actuator assembly supports one or more data transducers adjacent the data storage component(s).

Consistent with various other embodiments and aspects of the present disclosure, a hermetic seal is applied to a housing of a data storage assembly via a polymer material-filled permeability path. The polymer material is inserted into a cavity defined by opposing sidewalls of a base deck, which extend around a portion of the base deck (e.g., near a perimeter of the base deck). A base deck cover having a lip is inserted onto the base deck, and the lip interfaces with sidewalls of the cavity. The interface between the lip and cavity allows for a small thickness of polymer material to occupy the space between the lip and cavity walls. By pre-filling the cavity with the polymer material prior to insertion of the base deck cover lip, the resulting permeability path occupied by the polymer material is substantially free of polymer material voids.

In certain embodiments of the present disclosure, interleaved sidewalls define two parallel segments of a permeability path that increase the length of the permeability path for a given height of the outer region of the base deck. In many embodiments, the resulting permeability path provides a bond length that is longer than an overall height of the disc drive. Such an extended bond length may be implemented to reduce a leak rate of low density atmosphere from within the disc drive while minimizing clearance issues related to such an extended permeability path. For example, a permeability path utilizing interleaved sidewalls defining two parallel segments can allow for a sufficient bond length (to achieve a specified maximum leak rate), in applications in which a connector is attached to the disc drive to provide electrical power and communication paths.

Various structural aspects of regions used to seal a base deck and base deck cover can be tailored to specific applications. For instance, in some embodiments in which a base deck contains features such as attached components that may interfere with coupling of the cover to the base desk, an interface used to create a permeability path as discussed herein is implemented relative to the features. In some implementations, sidewall structures within the base deck form a permeability path that is defined by a plurality of different regions with different height dimensions, to accommodate features of the base deck. In such embodiments, different height dimensions are used for different portions of the permeability path. In certain implementations, the height of different regions of the permeability path is adjusted based on available height dimensions of other regions, to maintain a combined leakage rate that is less than a target leakage (e.g., 5%/year).

In another example embodiment in which the height of the permeability path is limited or leakage via the permeability path is unacceptable, multiple parallel segments are used to form the permeability path. In one such example, the base deck cover includes a multiplicity of lips that interface with opposing outer region cavities of the base deck and/or with one another. In some implementations, horizontal segments between paired parallel segments as defined by the lips and the base deck are also occupied by a polymer material to extend the total bond length of the permeability path.

One or more of the embodiments described herein may involve sealing an interface between a base deck and an electrical interconnect of a disc drive. The electrical interconnect communicatively couples electronic circuitry mounted to the exterior of the disc drive and electromechanical parts within the disc drive enclosure. Flex and printed circuit board connectors mounted to either side of the electrical interconnect are attached to respective circuitry inside and outside the disc drive enclosure. To further seal the disc drive, the electrical interconnect and base deck interface can be hermetically sealed to reduce the leakage of low density atmosphere from within the disc drive enclosure.

In another embodiment, the electrical interconnect and base deck as described above, are used with a seal plate to form a permeability path similar to those discussed above. The seal plate forms a second portion of an outer region of the cavity, with a first portion being defined by a feature of the base deck. The resulting cavity interfaces with the electrical interconnect, which includes a lip that interfaces with the cavity (e.g., similar to interfaces with base deck cover lips described above). Such an approach doubles the length of the permeability path, can minimize an overall size of the electrical interconnect package, and reduce the potential for interference with hard drive assembly components within the disc drive enclosure.

Aspects of the present disclosure also provide improved tolerances. In one such embodiment, an outer region cavity of a base deck has a width of 0.010", with a bond width on each side of a base deck cover lip being 0.005". The resulting allowance for the base deck and base deck cover features that collectively form the permeability path is 0.005", with a general average clearance of 0.010" between the base deck cavity and base deck cover lip.

Turning now to the figures, various examples of the present disclosure are presented by way of the illustrations. FIG. 1 is a perspective view of a partially assembled disc drive 100 including a base deck 105 that houses elements of the disc drive, in accordance with another embodiment. In some implementations, the disc drive 100 includes a spindle motor that rotates one or more data storage mediums and an actuator assembly that supports one or more data transducers adjacent the data storage medium(s). The base deck 105 includes an outer region 110 (e.g., a cavity) defined by an extrusion located around a perimeter of the base deck 105. The base deck cover 120 interfaces with the base deck 105 via the base deck lip 125 and the base deck's outer region 110. In various embodiments, one or more aspects of FIG. 1 are implemented in connection with one or more embodiments as discussed herein.

In some embodiments, the disc drive 100 also includes a secondary base deck cover 126 that provides a temporary/non-hermetic seal. Such a secondary base deck cover 126 allows the disc drive to be filled with a low-density atmosphere and operationally tested prior to hermetically sealing the drive via the base deck cover 120 and interfacing features 110 and 125. In the case of a failed operational test, the disc drive 100 may be re-worked by removing the secondary base deck cover 126, and the assembly process is repeated, minimizing scrap.

Figure 2:
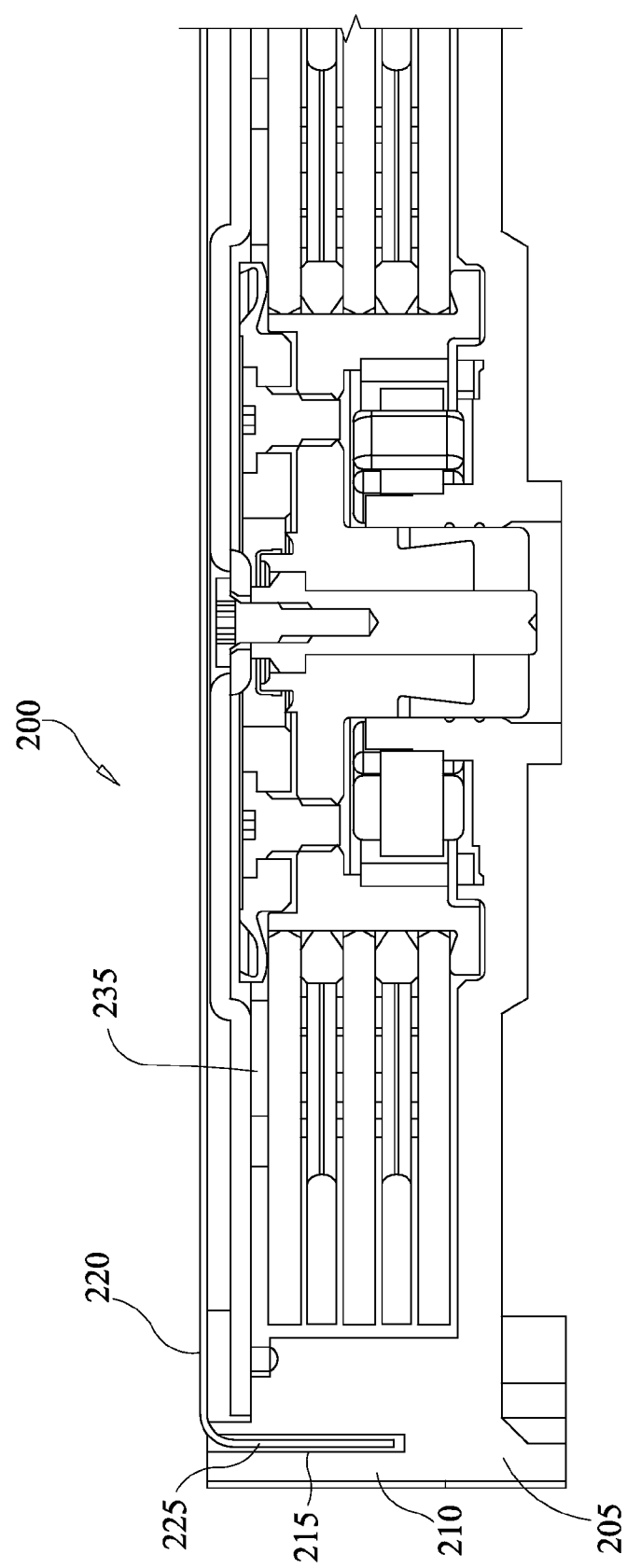
FIG. 2 is a partial cross-sectional side view of a base deck and base deck cover interfacing to provide a permeability path, consistent with various aspects of the present disclosure.

FIG. 2 shows a cross-sectional view of a mated base deck 205 and base deck cover 220. The lip 225 of the base deck cover 220 is seated into the outer region 210 (also referred to as a cavity) of the base deck 205. The two opposing walls of the outer region 210 and the lip 225 define two segments of a permeability path 215. A polymer material is inserted in the outer region 210 to occupy the permeability path 215.

The resulting permeability path 215 has a polymer bond length that is longer than the height of the base deck 205. Such an extended bond length can be used to greatly decrease the escape of low-density atmosphere 235 from the disc drive 200. Moreover, the permeability path 215 defines a bond width that further decreases the escape of the atmosphere 235 from the disc drive 200. In some implementations, the permeability path maintains a low-density atmosphere 235 (e.g., a helium atmosphere) within the disc drive 200 with a minimal leak rate (e.g., less than 5%/year).

In various implementations, features of the base deck 205 or components of the disc drive restrict a first height dimension of the outer region 210. In one such embodiment in which the height restriction is for a portion of the outer region 210, a second different height dimension for the outer region 210 of the base deck 205 defines a second region of the permeability path. In some clearance-limited applications, the permeability path 215 in the second region is defined by opposing surfaces of the base deck 205 and the base deck cover 220. In another embodiment, the permeability path 215 is defined by a plurality of parallel segments of the permeability path 215. The parallel segments are defined by a series of lips and outer regions. In some embodiments, the parallel segments are similar to the lip and outer region as shown in FIG. 2. The resulting permeability path provides an extended polymer bond length that mitigates the effect of the height dimension restriction. Such an embodiment may also be used in applications where the low density atmosphere leak rate from the disc drive must be less than 5%/year.

Figure 3:
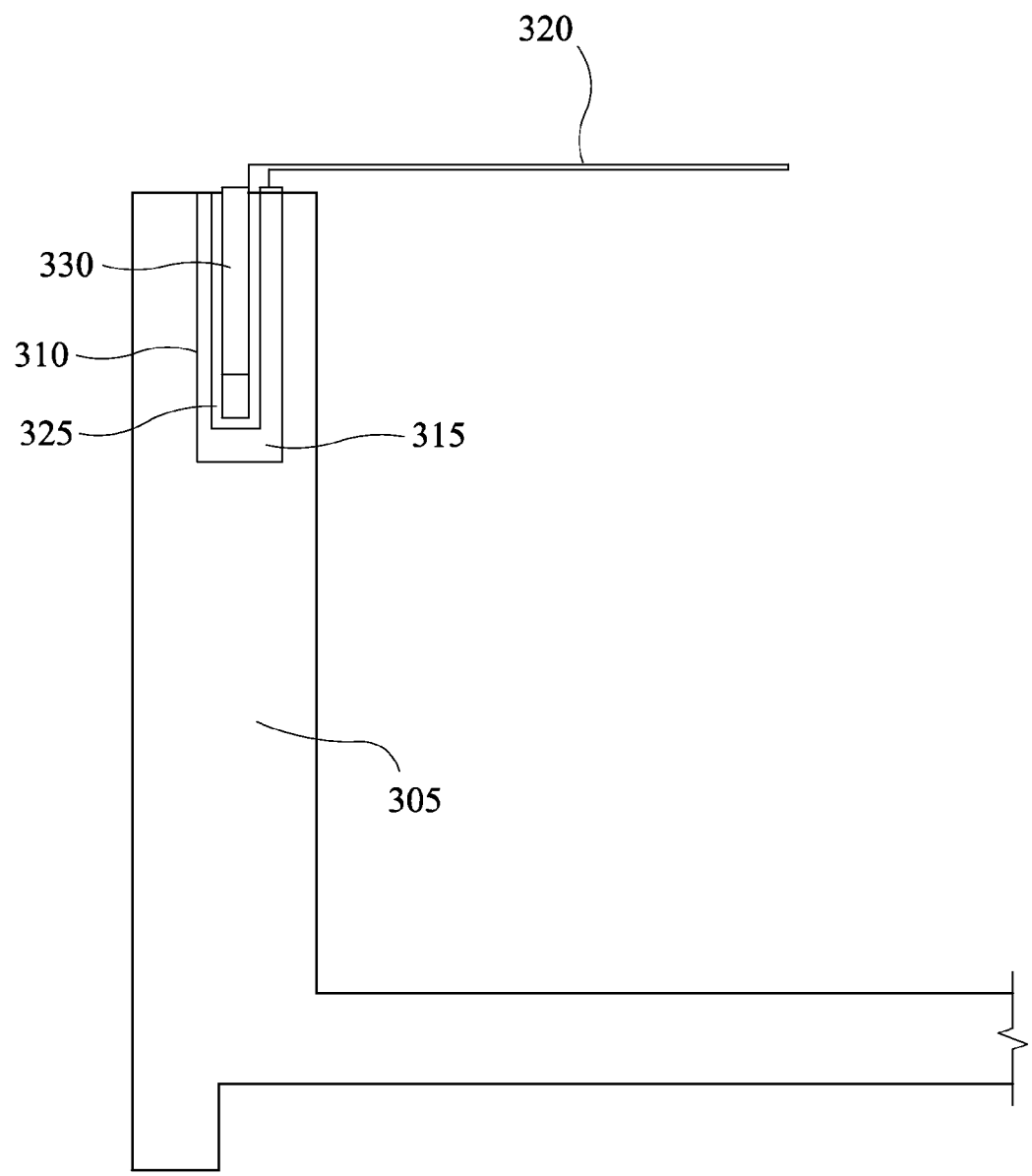
FIG. 3 is another partial cross-sectional side view of a base deck and base deck cover interfacing to provide a permeability path, consistent with various aspects of the present disclosure.

FIG. 3 shows a portion of a base deck 305 and a base deck cover 320, in accordance with another embodiment. An insert 330 is utilized to reduce/minimize a bond width of a permeability path 315. A cavity 310 of the base deck 305 is filled with a polymer material (e.g., an epoxy). The base deck cover 320 includes a U-shaped lip 325 mated to the cavity 310 in the base deck 305. During the mating process, the polymer material is pressed into the shape of the permeability path 315. The insert 330 is then inserted into the u-shaped lip 325, deforming the lip 325 and reducing the polymer bond width of the permeability path 315. The reduced polymer bond width reduces a resulting leak rate of the permeability path 315.

Figure 4:
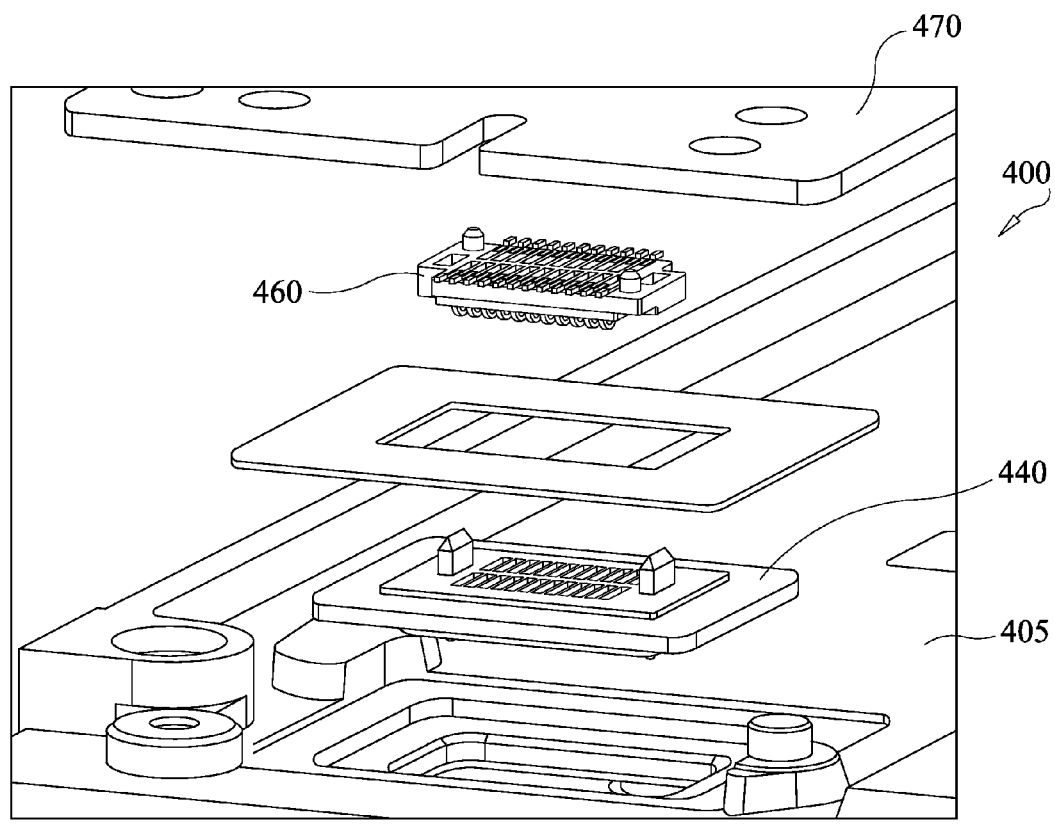
FIG. 4 is an exploded view of a base deck and base deck cover interfacing to provide a permeability path, consistent with various aspects of the present disclosure.

FIG. 4 shows an exploded view of a disc drive 400, in which a permeability path is used to hermetically seal a gap between an electrical interconnect 440 attached to a base deck 405, in accordance with another embodiment. The electrical interconnect 440 is used to transfer electronic communications and power into and out of a disc drive 400. A connector 460 provides data and power to a circuit board 470 or other electronic components (e.g., electric motors). Communication between electronics inside and outside the disc drive 400 is facilitated using a through-hole in the base deck 405, to allow for the electronic interconnect 440. A permeability path is utilized to provide a hermetic seal around the interface of the electrical interconnect 440 and the base deck 405.

Figure 5:
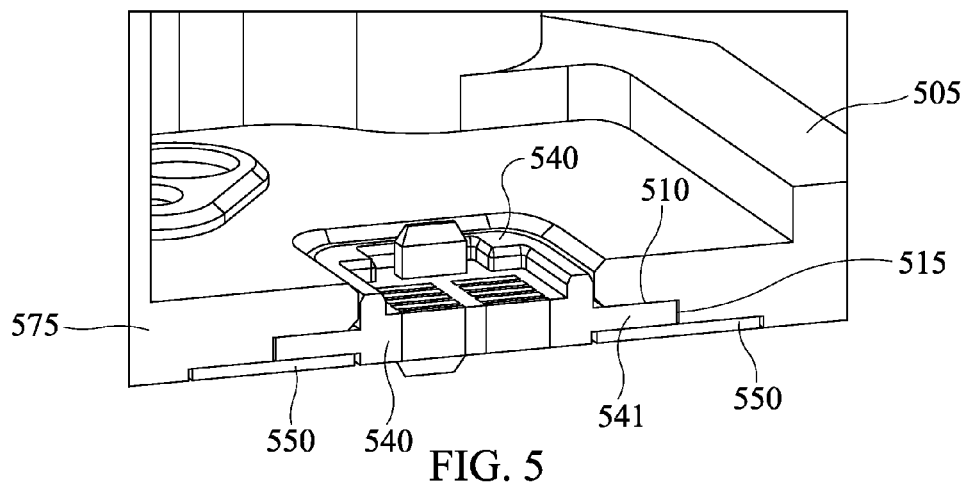
FIG. 5 is a partial cross-sectional side view of a base deck and base deck cover interfacing to provide a permeability path, consistent with various aspects of the present disclosure.

FIG. 5 shows another embodiment in which a hermetic seal is made around an electrical interconnect 540 by forming an elongated permeability path 515 in a cavity 510, which is defined by a portion of a base deck 505 and a seal plate 550. In such an embodiment, the electrical interconnect 540, base deck 505 and seal plate 550 are used to form a permeability path 515 similar to those discussed above. The seal plate 550 forms a second portion of the cavity 510, a first portion being defined by a feature of the base deck 505. The resulting cavity is formed when the respective portions are interfaced with the electrical interconnect 540. The electrical interconnect 540 includes a lip 541 that interfaces with the cavity 510 formed by the base deck 505 and seal plate 550 (e.g., as may be similar to the base deck cover lip described in embodiments above).

In some embodiments, the opposing surfaces of the seal plate 550, electrical interconnect 540, and base deck 505 contain additional interfacing lips 541 and cavities 510 in either surface. Such a plurality of interfacing features extend the bond length (e.g., as shown in FIGS. 4-5). The resulting permeability path 515 is filled with a polymer material that seals the interface between the base deck 505 and the electrical interconnect 540, with the resulting length of the permeability path being greater than the thickness of a bottom portion 575 of the base deck 505.

Based upon the above discussion and illustrations, those skilled in the art will readily recognize that various modifications and changes may be made to the present disclosure without strictly following the exemplary embodiments and applications illustrated and described herein. For example, the shape of the permeability path need not conform to the exemplary embodiments discussed herein, the permeability path as claimed is intended to cover a wide variety of shapes and variations of such an elongated permeability path, including non-parallel segments and segments with varying length and widths. Such modifications do not depart from the true spirit and scope of the present disclosure, including that set forth in the following claims.

What is claimed is:

1. An apparatus comprising:
    a base deck having a surface with an inner region and an outer region, the outer region defining a cavity and enclosing the inner region, the inner region defining an interior bottom surface, and the outer region defining an interior sidewall that extends from the bottom surface and therein defines an opening into the base deck along a perimeter of the interior sidewall;
    a polymer material;
    a base deck cover having a lip configured to interface with the outer region of the base deck and cover the opening in the base deck along the perimeter of the interior sidewall, the lip and the outer region configured and arranged to provide,
        a permeability path occupied by the polymer material, at least three interleaved sidewalls respectively defining two segments of the permeability path, and
        a hermetic seal along the interleaved sidewalls and enclosing the inner region of the surface;
    wherein the outer region is configured and arranged to receive the lip in the cavity while maintaining a shape of the cavity; and wherein the permeability path has a length that is greater than a height of the base deck.

2. The apparatus of claim 1, wherein the permeability path occupied by the polymer material is free of voids, said at least three sidewalls respectively define two parallel segments of the permeability path perpendicular to the surface of the base deck.

3. The apparatus of claim 1, wherein the outer region of the base deck has a first height dimension and a second, different height dimension respectively providing two different regions of the permeability path, respectively defined by first and second segments of differently-dimensioned portions of said at least three sidewalls, the first and second height dimensions are perpendicular to the surface of the base deck, and the interface between the lip and the cavity runs parallel to the direction of the first and second height dimensions.

4. The apparatus of claim 1, wherein the permeability path occupied by the polymer material is free of voids, the outer region of the base deck has a first height dimension and a second, different height dimension respectively providing two different regions of the permeability path, respectively defined by first and second segments of differently-dimensioned portions of said at least three sidewalls, and wherein the lip and the outer region are further configured and arranged to provide a total rate of low density atmosphere leakage from an area between the base deck and the base deck cover that is not greater than 1 cm$^3$/year ($1\times10^{-8}$ cm$^3$/sec).

5. The apparatus of claim 1, wherein the lip and the outer region are further configured and arranged to provide a total rate of low density atmosphere leakage from an area between the base deck and the base deck cover that is not greater than 1 cm$^3$/year ($1\times10^{-8}$ cm$^3$/sec).

6. The apparatus of claim 5, wherein the low density atmosphere is characterized as a helium atmosphere with a pressure higher than a standard earth atmospheric pressure.

7. The apparatus of claim 1, wherein the base deck has a first height dimension and a second, different height dimension respectively providing two different regions of a second permeability path, one of the two different regions providing for an electrical interconnect through the outer region of the base deck.

8. The apparatus of claim 7, wherein the second permeability path has an elongated portion that extends along a direction that is parallel to a line defining the electrical interconnect.

9. The apparatus of claim 7, further including the electrical interconnect, the electrical interconnect including a seal plate configured and arranged to interface with the two different regions of the second permeability path.

10. The apparatus of claim 1, wherein the base deck and base deck cover comprise a housing that internally supports a spindle motor adapted to rotate at least one data storage medium, and an actuator assembly adapted to support at least one data transducer adjacent the at least one data storage medium.

11. The apparatus of claim 1, wherein the base deck cover includes a plurality of lips configured to define the permeability path by interfacing with a plurality of cavities in the outer region of the base deck.

12. The apparatus of claim 1, further comprising a secondary base deck cover positioned between the base deck cover and a low density atmosphere within the apparatus, the secondary base deck cover configured and arranged to temporarily retain the low density atmosphere within the apparatus.

13. The apparatus of claim 1, wherein
the cavity is a recess in the outer region and extends around the perimeter and parallel to the interior sidewall,
the base deck cover lip extends into the recess and around the perimeter of the interior sidewall, and
respective surfaces of the lip and the cavity that face one another define a portion of the permeability path.

14. An apparatus comprising:
a base deck including a surface with a first cavity defined by at least two opposing sidewalls, the at least two sidewalls extending around and enclosing an inner region of the surface;
a polymer material;
a base deck cover having a lip configured to interface with a second cavity in the opposing sidewalls of the base deck, the lip and the second cavity configured and arranged to
provide a permeability path occupied by the polymer material, and
define two segments of the permeability path;
the base deck and base deck cover configured and arranged to form a hermetically sealed housing to contain low density atmosphere in an opening in the inner region, with the inner region being enclosed by an inner bottom surface and an inner sidewall surface of the base deck as well as an inner surface of the base deck cover that faces the inner bottom surface; and
the housing is further configured to support a spindle motor adapted to rotate at least one data storage medium and an actuator assembly adapted to support at least one data transducer adjacent the at least one data storage medium; and wherein the permeability path has a length that is greater than a height of the base deck.

15. The apparatus of claim 14, wherein the lip of the base deck cover and the second cavity of the base deck both have first and second height dimensions that respectively provide two different regions of the permeability path, the first and second height dimensions are perpendicular to the surface of the base deck, and the interface of the lip and the second cavity runs parallel to the direction of the first and second height dimensions.

16. The apparatus of claim 14, further including an electrical interconnect having a seal plate configured and arranged to interface with the first cavity of the base deck to form another permeability path occupied by additional polymer material.

17. An apparatus, comprising:
a base deck including a surface with a cavity defined by at least two opposing sidewalls, the at least two sidewalls extending around and enclosing an inner region of the surface;
a polymer material;
a base deck cover having a lip configured to interface with the cavity of the base deck, the lip and the cavity configured and arranged to
provide a permeability path occupied by the polymer material, and
define two segments of the permeability path, wherein a total length of the permeability path is greater than a height of the base deck, and the at least two opposing sidewalls of the base deck are configured and arranged to receive the lip in the cavity while maintaining a shape of the cavity;
the base deck and base deck cover configured and arranged to form a hermetically sealed housing to contain low density atmosphere in an opening in the inner region, with the inner region being enclosed by an inner bottom surface and an inner sidewall surface of the base deck as well as an inner surface of the base deck cover that faces the inner bottom surface; and the housing is further configured to support a spindle motor adapted to rotate at least one data storage medium; and wherein the permeability path has a length that is greater than a height of the base deck and an actuator assembly adapted to support at least one data transducer adjacent the at least one data storage medium.

* * * * *